(12) United States Patent
Shimizu et al.

(10) Patent No.: US 6,574,439 B1
(45) Date of Patent: Jun. 3, 2003

(54) PHOTOMETRIC APPARATUS FOR CAMERA

(75) Inventors: Seiji Shimizu, Ohmiya (JP); Yuko Kobayashi, Hachioji (JP); Toshio Takahashi, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/542,282

(22) Filed: Apr. 4, 2000

Related U.S. Application Data

(62) Division of application No. 08/863,005, filed on May 23, 1997, now Pat. No. 6,072,959.

(30) Foreign Application Priority Data

May 24, 1996 (JP) ................................. 8-129998

(51) Int. Cl.[7] ................................. G03B 7/099
(52) U.S. Cl. ................. 396/268; 396/274; 359/558
(58) Field of Search ....................... 396/241, 268, 396/274, 276; 359/619, 621, 622, 623, 625, 626, 558, 563, 565, 566, 570

(56) References Cited

U.S. PATENT DOCUMENTS

| | | | |
|---|---|---|---|
| 3,221,624 A | 12/1965 | Haupt et al. | |
| 3,416,867 A | 12/1968 | Biber | |
| 5,302,998 A | * 4/1994 | Kawano | 396/268 |
| 5,349,471 A | * 9/1994 | Morris et al. | 359/565 |
| 5,581,405 A | * 12/1996 | Meyers et al. | 359/569 |
| 5,668,919 A | 9/1997 | Ito | |
| 5,703,721 A | * 12/1997 | Bietry et al. | 359/558 |
| 5,715,091 A | * 2/1998 | Meyers | 359/565 |
| 6,021,106 A | * 2/2000 | Welch et al. | 264/1.31 |

FOREIGN PATENT DOCUMENTS

| | | |
|---|---|---|
| JP | 5-27304 | 2/1993 |
| JP | 6-250251 | 9/1994 |

* cited by examiner

*Primary Examiner*—David M. Gray
(74) *Attorney, Agent, or Firm*—Pillsbury Winthrop LLP

(57) ABSTRACT

A photometric apparatus which satisfies the demands for reductions in the size, thickness and cost and which is highly optioned despite a simple arrangement. A photometric optical system provided separately from a photographic optical system (1) has at least one diffractive optical element (10). The diffraction surface of the diffractive optical element (10) is provided on a convex lens surface to have a converging action. Alternatively, the diffraction surface of the diffractive optical element (10) is provided on a concave lens surface to have a diverging action.

6 Claims, 9 Drawing Sheets

FIG. 14
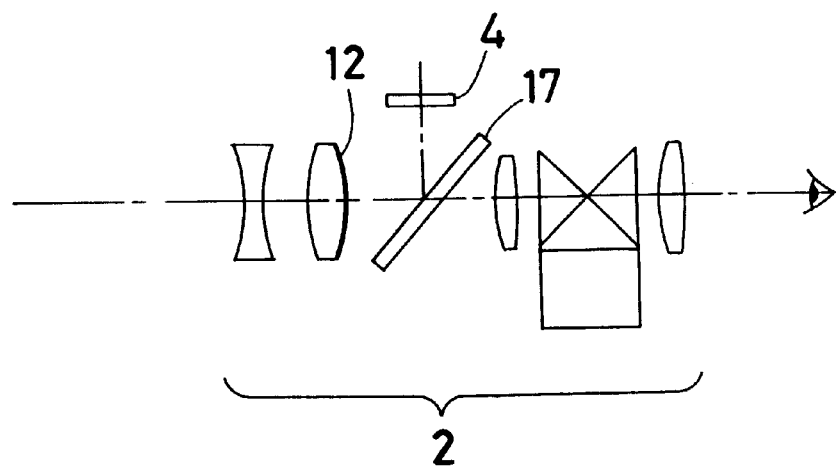
FIG. 15
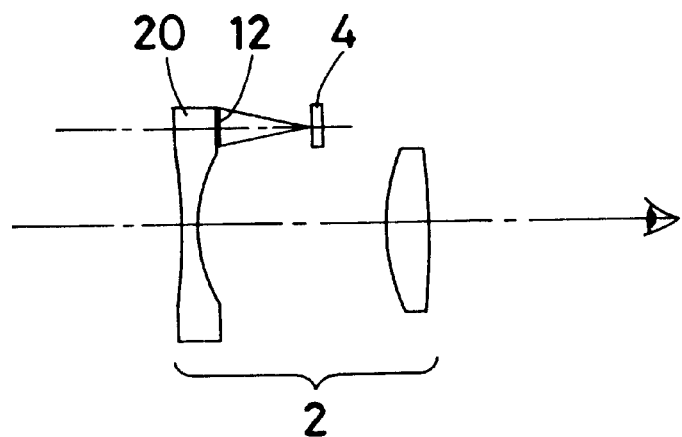
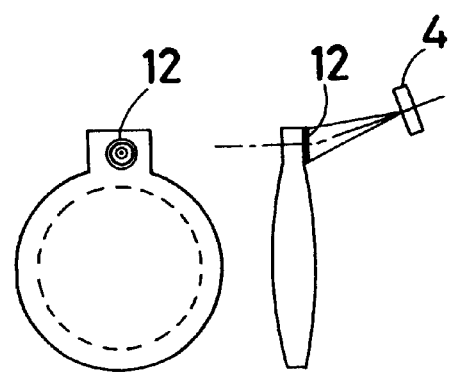
FIG.16(a)   FIG.16(b)

PHOTOMETRIC APPARATUS FOR CAMERA

This is a division of application Ser. No. 08/863,005, filed May 23, 1997, now U.S. Pat. No. 6,072,959.

BACKGROUND OF THE INVENTION

1. Field of the Invention

The present invention relates to a photometric apparatus for a camera. More particularly, the present invention relates to a photometric apparatus for a camera which uses a diffractive optical element.

2. Discussion of Related Art

A conventional photometric apparatus for a single-lens reflex camera, for example, is arranged as shown in FIG. 23. A conventional photometric apparatus for a lens shutter camera is arranged as shown in FIG. 24. In these figures, reference numeral 1 denotes a photographic optical system; 2 denotes a finder optical system; 3 denotes a condenser lens for photometry; 4 denotes a light-receiving element for photometry; 5 denotes a quick return mirror; 6 denotes a sub-mirror; 7 denotes a film plane; 8 denotes a photometer window; and 9 denotes a finder window. In many cases, the condenser lens 3 consists essentially of a single lens element by virtue of the spread of aspherical plastic lenses and other similar lenses. This contributes to reductions in the size, thickness and cost of photometric apparatuses.

In recent years, however, there have been increasing demands for reductions in the size, thickness and cost of cameras and for achievement of higher value-added cameras. Under these circumstances, photometric apparatuses must be designed to be capable of meeting these demands.

Recently, the use of diffractive optical elements (hereinafter referred to as "DOE") has begun in consequence of the improvement in optical technology. Examples of prior art that use a DOE in a photometric apparatus for a camera include Japanese Patent Application Unexamined Publication Numbers [hereinafter referred to as "JP(A)"] 5-27304 and 6-250251.

JP(A) 5-27304 proposes a photometric system in which a bundle of light rays is diffracted and reflected by using a hologram, and a part of the ray bundle is separated by a half-mirror and used for photometry.

JP(A) 6-250251 proposes a photometric apparatus for a lens shutter camera in which a DOE is set in front of an aperture stop in a photographic optical system to divide an optical path for photometry.

In particular, lens shutter cameras need to make various improvements in terms of the size of the apparatus, the restriction on design due to the presence of the photometer window, the reliability in the accuracy of photometry, the production cost, etc.

In a case where the condenser lens is formed from a single lens element as has been stated above, the radius of curvature of the condenser lens is reduced in order to ensure an extremely strong power, and the center thickness of the lens is increased in order to ensure the required thickness for the lens edge, causing the apparatus to increase in overall thickness. This has a significant effect on the layout of the interior of the camera and leads to an increase in the overall size of the camera.

The same is said of the presence of the photometer window. In addition, the photometer window restricts the design freedom.

It is conceivable for the optical axis to be bent to make good use of the limited space. However, the provision of a reflecting member or the like leads to a rise in the cost, unfavorably.

Further, parallax may occur because of the external photometry type, and it is difficult to perform photometry according to photographic conditions (e.g. field angle changes during zooming photography or switching between normal and panoramic photography modes). Therefore, it is difficult to obtain high reliability.

In the case of a thick and long lens barrel, as in recent zoom lenses of high zoom ratio, the lens barrel itself may vignette a part of the acceptance angle.

Single-lens reflex cameras are also demanded to be further reduced in size, weight and cost. Some single-lens reflex cameras employ in-finder photometry. In this case, however, the amount of light reaching the film plane and the amount of light reaching the light-receiving element do not coincide with each other. Therefore, the photometry accuracy is unfavorably low.

There are apparatuses that use a Fresnel lens. However, this type of apparatus is not efficient because it suffers from a large loss of light quantity.

SUMMARY OF THE INVENTION

In view of the above-described problems associated with the prior art, an object of the present invention is to provide a photometric apparatus which satisfies the demands for reductions in the size, thickness and cost and which is highly optioned despite a simple arrangement by disposing a DOE even more effectively in the above-described photometric apparatus according to the prior art.

To attain the above-described object, the present invention provides a photometric apparatus for a camera, which is characterized in that a photometric optical system provided separately from a photographic optical system has at least one diffractive optical element.

In addition, the present invention provides a photometric apparatus for a camera, which is characterized in that an exterior part of the camera is formed from a diffractive optical element, and a bundle of light rays passing through the diffractive optical element is led to a light-receiving element for photometry.

In addition, the present invention provides a photometric apparatus for a single-lens reflex camera, which is characterized in that a photometric optical system includes a half-mirror or a reflecting mirror which is provided with a diffraction surface having a converging action, and at least a part of a bundle of light rays passing through or reflected by the diffraction surface is led to a light-receiving element for photometry.

In addition, the present invention provides a photometric apparatus for a camera, which is characterized in that at least one diffraction surface having an optical path dividing action is provided on a lens surface of a photographic optical system in an area where an effective ray bundle passes, and at least a part of a bundle of light rays passing through the diffraction surface is led to a light-receiving element for photometry, and that the diffraction surface has concentric rotationally symmetric patterns formed thereon.

In addition, the present invention provides a photometric apparatus for a camera, which is characterized in that at least one diffraction surface is provided on an external portion of an optical system other than a photometric optical system in an area other than an area where an effective ray bundle passes, and a bundle of light rays passing through the diffraction surface is led to a light-receiving element for photometry.

In addition, the present invention provides a photometric apparatus for a camera, which is characterized in that at least two diffraction surfaces are provided on the same substrate, and that a bundle of light rays passing through at least one of the diffraction surfaces is led to a light-receiving element for distance measurement, and a bundle of light rays passing through at least one other of the diffraction surfaces is led to a light-receiving element for photometry.

In addition, the present invention provides a photometric apparatus for a camera, which is characterized in that a photometric optical system having at least one diffractive-optical element with at least one diffraction surface is adapted to change a magnification according to photography conditions such as a magnification change and switching to a panoramic photography mode, and a bundle of light rays subjected to a magnification change by the photometric optical system is led to a light-receiving element for photometry.

According to the present invention, a diffractive optical element is provided in a photometric optical system for a camera, thereby making it possible to provide a photometric apparatus for a camera which satisfies the demands for reductions in the size, thickness and cost of the apparatus. Further, the present invention enables the photometric apparatus to be highly optioned despite a simple arrangement while satisfying the demands for reductions in the size, thickness and cost.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 14 is a conceptual view showing the thirteenth embodiment of the present invention.

FIG. 15 is a conceptual view showing a fourteenth embodiment of the present invention.

FIGS. 16(a) and 16(b) are conceptual views showing a modification of the fourteenth embodiment.

DESCRIPTION OF THE PREFERRED EMBODIMENTS

The arrangement and operation of the photometric apparatus for a camera according to the present invention will be described below by way of embodiments.

FIGS. 1 to 5 show embodiments of a first photometric apparatus for a camera according to the present invention.

[First Embodiment]

Figure 1:
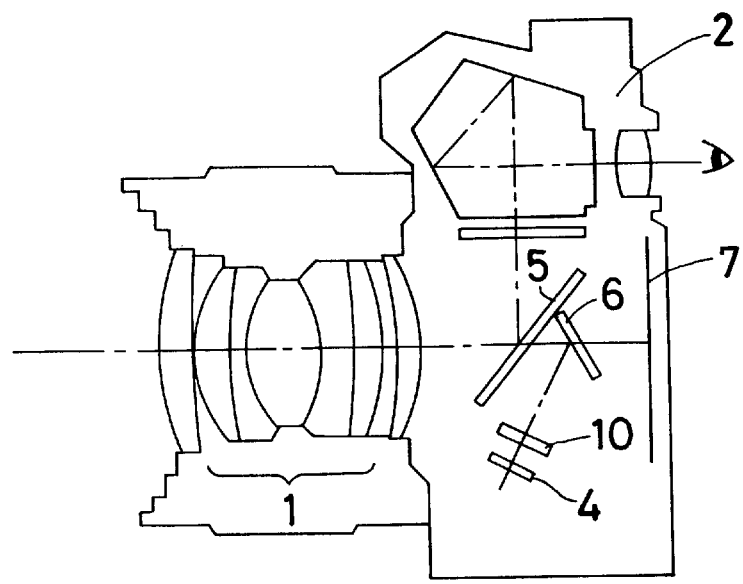
FIG. 1 is a conceptual view showing a first embodiment of the present invention.

FIG. 1 is a conceptual view showing a first embodiment of the present invention, in which a plate-shaped DOE 10 having a converging lens action is provided in a photometric optical system for a single-lens reflex camera. A quick return mirror 5 having a half-mirror portion is disposed in an optical path of a photographic optical system 1. A part of a bundle of light rays from the photographic optical system 1 passes through the half-mirror portion of the quick return mirror 5 and is reflected by a sub-mirror 6 and led through the DOE 10 to a light-receiving element 4 to perform photometry. In the first embodiment, the DOE 10 has a converging lens action. In the first embodiment, because the DOE 10 has a converging lens action, the lens surface, which usually assumes a converging lens action, has an extremely gentle curvature. Consequently, the center thickness of the lens need not be increased to a considerable extent in order to ensure the required thickness for the lens edge. Thus, the center thickness of the lens is favorably minimized.

In the first embodiment, the photometric optical system, which has heretofore been formed from a single lens of large center thickness or a plurality of lenses of small center thickness, consists essentially of a single thin DOE 10. Accordingly, it becomes possible to reduce the thickness of the photometric apparatus and to simplify the arrangement thereof. By forming the DOE 10 in the shape of a plate which is flat at both sides thereof, an apparatus which is thinner and more lightweight can be realized.

[Second Embodiment]

Figure 2:
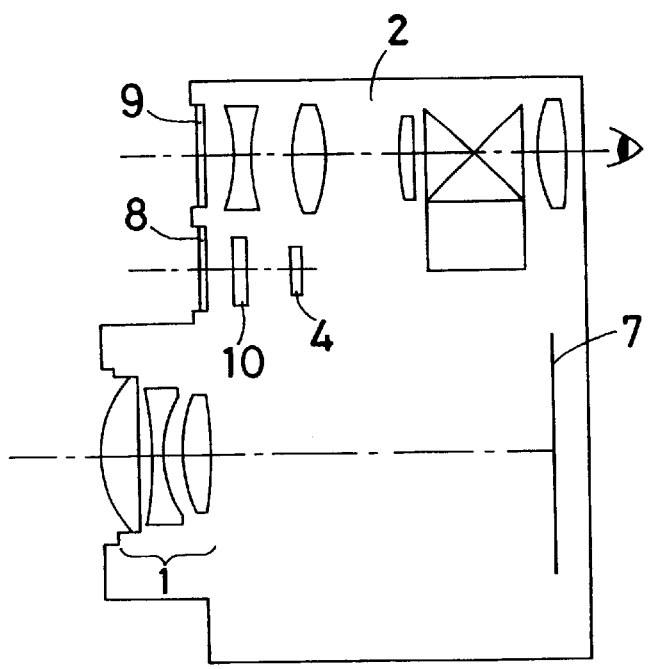
FIG. 2 is a conceptual view showing a second embodiment of the present invention.

FIG. 2 is a conceptual view showing a second embodiment of the present invention, in which a plate-shaped DOE 10 having a converging lens action is provided in a photometric optical system for a lens shutter camera. A bundle of light rays entering the photometric optical system through a photometer window 8 is led through the DOE 10 to a light-receiving element 4 to perform photometry. In the second embodiment, the DOE 10 has a lens action as in the case of the first embodiment. Thus, the second embodiment provides advantageous effects similar to those in the first embodiment.

In the second embodiment, the front surface of the DOE 10 is formed from a diffraction surface. The diffraction surface is provided on a curved surface having a positive (converging) lens action, and has a converging action. In the second embodiment, because the diffraction surface has a converging action, the curvature of the curved surface provided with the diffraction surface is favorably gentle. In other words, the depth of the lens surface is shallow, and the external size (the overall thickness in the optical axis direction) of the lens is favorably small. Thus, it is possible to reduce the size and thickness of the apparatus.

In the second embodiment, the DOE 10 may be arranged such that the rear surface of the DOE 10 is formed as a curved surface having a negative (diverging) lens action, and a diffraction surface having a diverging action is provided on the curved surface. In this case, the DOE 10 has a converging surface on the front side thereof and a diverging surface on the rear side thereof. Consequently, it is possible to move the back principal point toward the front side and hence possible to reduce the overall length of the photometric optical system. If the rear surface of the DOE 10 is also formed as a diffraction surface as in the case of the first embodiment, it becomes possible to reduce the thickness of the apparatus. More specifically, the rear surface of the DOE 10 can be formed with a gentle curvature while having a negative lens action. Accordingly, the depth of the lens surface becomes shallow, and the external size (the overall thickness in the optical axis direction) of the lens is reduced.

[Third Embodiment]

Figure 3:
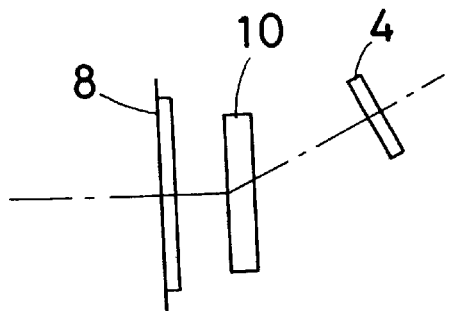
FIG. 3 is a conceptual view showing a third embodiment of the present invention.

FIG. 3 is a conceptual view of a third embodiment of the present invention, in which the entrance and exit axes of a DOE 10 are not coincident with each other. In the third embodiment, the center of rotation of patterns constituting the DOE 10 is set off the optical axis, thereby allowing the DOE 10 to have an exit axis deflecting action as well as a lens action. Thus, a light-receiving element 4 can be disposed with a high degree of freedom, and it is possible to make good use of the limited space. The third embodiment also provides advantageous effects similar to those in the first embodiment.

[Fourth Embodiment]

Figure 4:
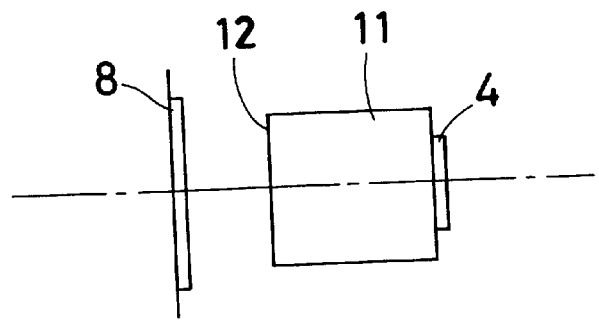
FIG. 4 is a conceptual view showing a fourth embodiment of the present invention.

FIG. 4 is a conceptual view showing a fourth embodiment of the present invention in which a DOE and a light-receiving element 4 are integrally formed as one unit. A package 11 covering the light-receiving element 4 is provided with a diffraction surface 12 having a lens action.

[Fifth Embodiment]

Figure 5:
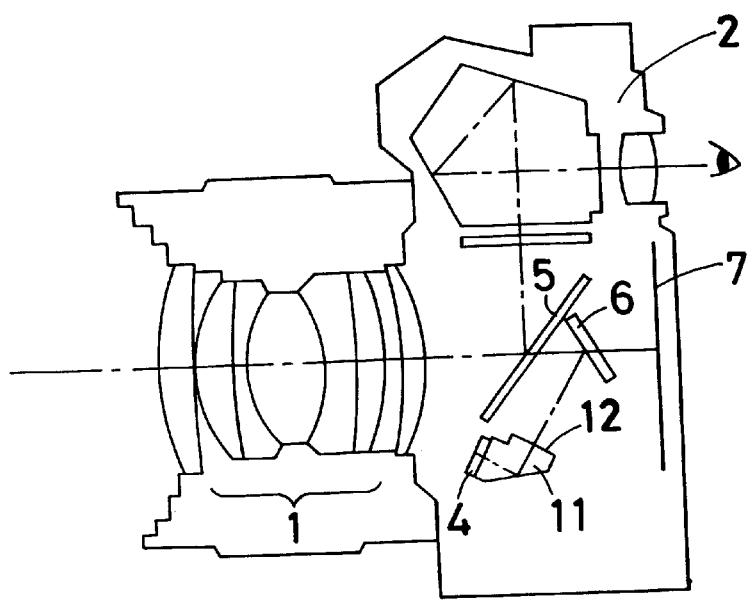
FIG. 5 is a conceptual view showing a fifth embodiment of the present invention.

FIG. 5 is a conceptual view showing a fifth embodiment of the present invention, in which a diffraction surface 12 having a lens action and a light-receiving element 4 are integrally formed on a prism.

In the fourth and fifth embodiments, the DOE is integrally formed with the light-receiving element 4 for photometry, thereby enabling a reduction in the number of components and simplifying the assembly of the apparatus. These embodiments also provide advantageous effects similar to those in the first embodiment.

In the above-described first photometric apparatus for a camera according to the present invention, the provision of a DOE having a lens action makes it possible to reduce the thickness of the photometric optical system and to simplify the arrangement thereof.

Next, the arrangement and operation of a second photometric apparatus for a camera according to the present invention will be described.

Figure 6:
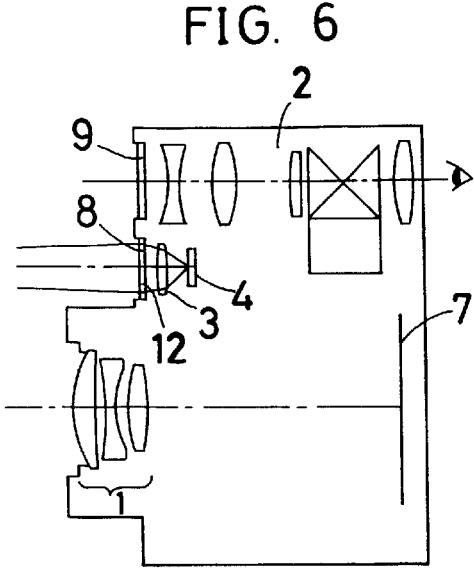
FIG. 6 is a conceptual view showing a sixth embodiment of the present invention.
Figure 7:
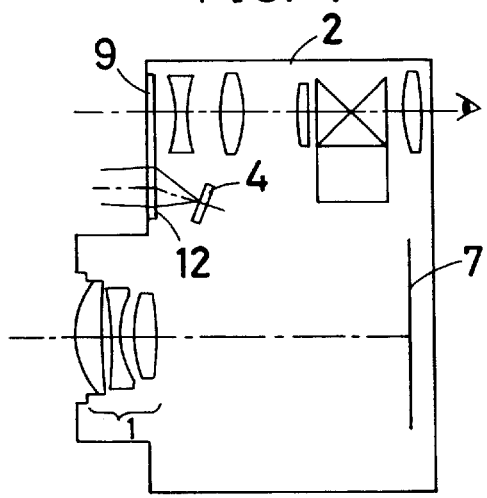
FIG. 7 is a conceptual view showing a seventh embodiment of the present invention.
Figure 8:
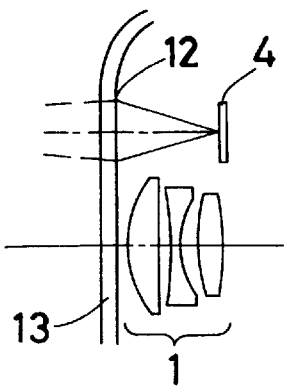
FIG. 8 is a conceptual view showing an eighth embodiment of the present invention.

FIGS. 6 to 8 show embodiments of a second photometric apparatus according to the present invention. In all of these embodiments, a diffraction surface is provided in an exterior part (window) of a camera.

[Sixth Embodiment]

FIG. 6 is a conceptual view showing a sixth embodiment of the present invention. In this embodiment, the present invention is applied to a photometric optical system for a lens shutter camera. A photometer window 8 is provided with a diffraction surface 12 having a converging lens action. A bundle of light rays entering the photometric optical system through the photometer window 8 is led to a light-receiving element 4 through a condenser lens 3 for photometry, thereby performing photometry. In the sixth embodiment, the diffraction surface 12 is given a converging lens action to share the power required for the photometric optical system with condenser lens 3. Thus, the condenser lens 3 can be formed from a surface having a gentle curvature, and the thickness of the optical system can be reduced.

If a diffraction surface 12 having a lens action of strong light-gathering power is provided in the photometer window 8, it becomes possible to dispense with the condenser lens 3 and hence possible to further reduce the number of components and the size and cost of the apparatus.

[Seventh Embodiment]

FIG. 7 is a conceptual view showing a seventh embodiment of the present invention, in which a finder window 9 is formed integral with a photometer window and provided with a diffraction surface 12 which is arranged such that the center of rotation of patterns thereof is set off the optical axis. In this embodiment, the diffraction surface 12 has an exit axis deflecting action as well as a lens action of strong light-gathering power. Thus, a light-receiving element 4 can be disposed with a high degree of freedom, and it is possible to make good use of the space in the camera. Further, because the finder window 9 and the photometer window are integral with each other, the number of components is reduced.

[Eighth Embodiment]

FIG. 8 is a conceptual view showing an eighth embodiment of the present invention, in which a diffraction surface 12 is provided in a waterproof cover window 13 of a photographic optical system 1, and a bundle of light rays entering through the diffraction surface 12 is led to a light-receiving element 4. In this embodiment, the diffraction surface 12 is given a lens action. Further, the diffraction surface 12 is provided in the window 13 in front of the photographic optical system 1 to solve the problem that a part of the acceptance angle may be vignetted by the lens barrel.

In the second photometric apparatus according to the present invention, a diffraction surface having a converging lens action is provided in an exterior part (window) of a camera. Thus, it becomes possible to reduce the thickness of the photometric optical system and to simplify the arrangement thereof. By giving a strong converging lens action to the diffraction surface, it becomes possible to reduce the number of components and to achieve a reduction in the cost.

In all the embodiments of the second photometric apparatus, the diffraction surface 12 is provided inside an exterior part (window) of the camera. The DOE is susceptible to dust, contamination, flaw, etc. Therefore, it is preferable to provide the diffraction surface inside an exterior part of the camera so that it will not be touched directly with the user's hand.

Next, the arrangement and operation of a third photometric apparatus according to the present invention will be described.

Figure 9:
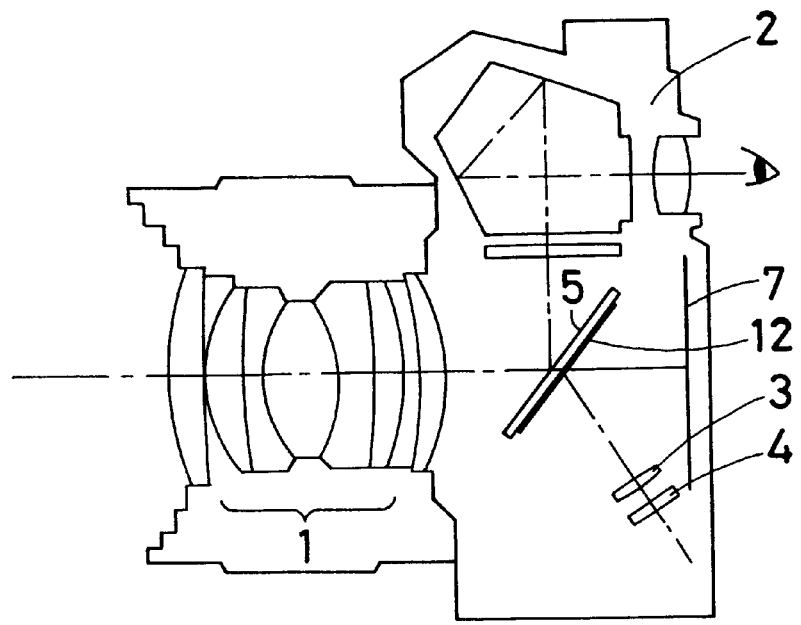
FIG. 9 is a conceptual view showing a ninth embodiment of the present invention.
Figure 10:
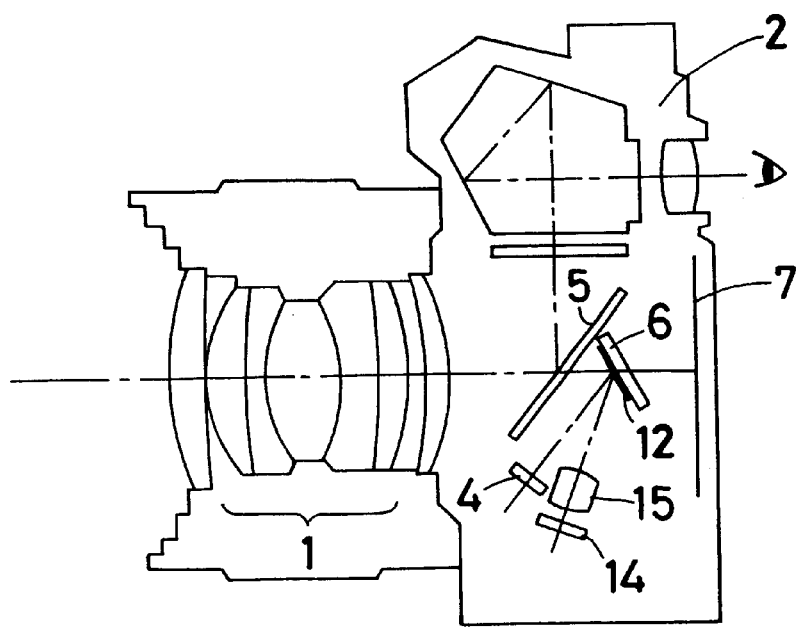
FIG. 10 is a conceptual view showing a tenth embodiment of the present invention.

FIGS. 9 and 10 show embodiments of the third photometric apparatus according to the present invention.

[Ninth Embodiment]

FIG. 9 is a conceptual view showing a ninth embodiment of the present invention. A diffraction surface 12 having both a converging lens action and an exit axis deflecting action is provided on the back surface of a quick return mirror 5, which is a half-mirror incorporated in a single-lens reflex camera. A bundle of light rays from a photographic optical system 1 is incident on the quick return mirror 5. A part of the ray bundle passes through the quick return mirror 5 and is bent by the diffraction surface 12 so as to be led to a light-receiving element 4 to perform photometry.

Figure 23:
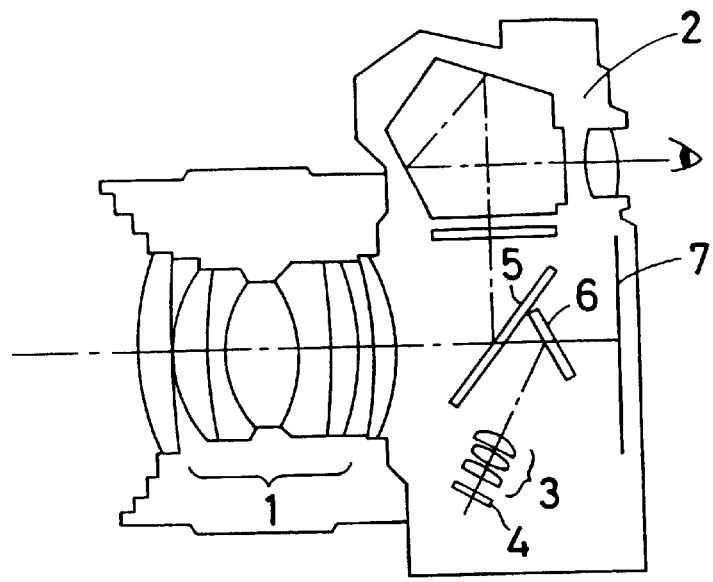
FIG. 23 is a conceptual view showing a conventional photometric optical system for a single-lens reflex camera.
Figure 24:
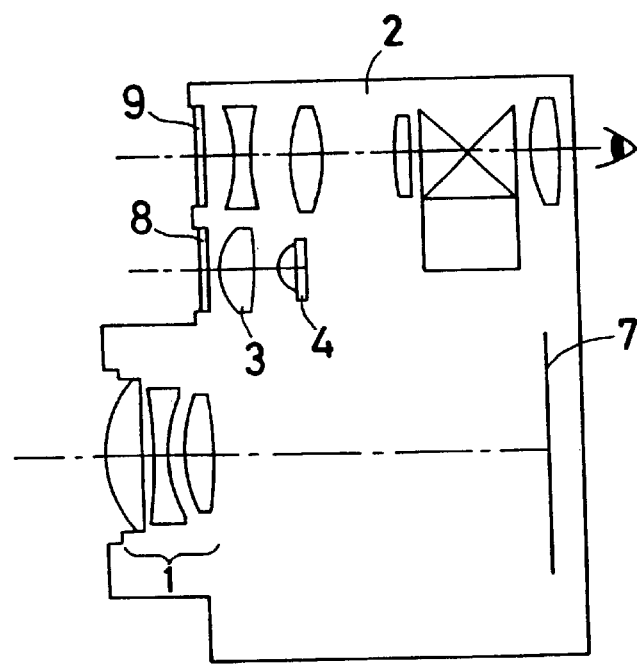
FIG. 24 is a conceptual view showing a conventional photometric optical system for a lens shutter camera.

Conventionally, a photometric optical system for a single-lens reflex camera is arranged as shown in FIG. 23 such that a bundle of light rays from a photographic optical system is incident on a quick return mirror 5, and that part of the ray bundle which passes through the half-mirror portion of the quick return mirror 5 is reflected by a sub-mirror 6 located behind the quick return mirror 5 and thus led to a light-receiving element 4. In this embodiment, as shown in FIG. 9, the quick return mirror 5 is provided with the diffraction surface (DOE) 12 to lead the ray bundle from the photographic optical system 1 directly to the light-receiving element 4, thereby dispensing with the sub-mirror that has heretofore been provided, and thus realizing a cost reduction. The light-receiving element 4 can be installed at any position. Therefore, this embodiment is also advantageous to the layout configuration. If the diffraction surface 12 is given a strong converging lens action, it is possible to dispense with the condenser lens 3.

In the ninth embodiment, the diffraction surface 12 may be formed in a multiple structure consisting essentially of two diffraction surfaces having different exit angles so that a bundle of light rays passing through one diffraction surface is led to a light-receiving element for photometry, and a bundle of light rays passing through the other diffraction surface is led to a light-receiving element for distance measurement. In this case, it becomes possible to perform distance measurement at the same time as photometry is performed. Accordingly, the number of components can be reduced. Thus, it is possible to achieve a reduction in the cost and space savings.

[Tenth Embodiment]

FIG. 10 is a conceptual view showing a tenth embodiment of the present invention. The front side of a sub-mirror 6 located behind a quick return mirror 5 is provided with a diffraction surface 12 formed in a multiple structure consisting essentially of two diffraction surfaces having a converging lens action and blazed for each wavelength. A bundle of light rays reflected by the sub-mirror 6 is divided into two ray bundles according to wavelengths. One ray bundle is led to a light-receiving element 4 for photometry, and the other ray bundle is led to a light-receiving element 14 for distance measurement.

In the tenth embodiment, it is possible to simultaneously perform distance measurement and photometry with the sub-mirror 6 disposed as in the conventional apparatus. Accordingly, the number of components can be reduced. Thus, it is possible to achieve a reduction in the cost and space savings.

By varying the light-gathering power for each blazed diffraction surface, it becomes possible to arrange the components of the photometric and distance measuring apparatuses with an increased degree of freedom.

Next, the arrangement and operation of a fourth photometric apparatus according to the present invention will be described.

FIGS. 11 to 14 show embodiments of the fourth photometric apparatus according to the present invention.

First and second specific examples of the fourth photometric apparatus relate to a photographic optical system and a photometric apparatus. The first specific example is a photometric apparatus having at least one diffraction surface having an action by which an optical path is divided in a photographic optical system, wherein at least a part of a bundle of light rays passing through the diffraction surface is led to a light-receiving element for photometry. The photometric apparatus is characterized in that the diffraction surface has concentric rotationally symmetric patterns formed thereon. The second specific example is a photometric apparatus in which at least one diffraction surface having an optical path dividing action is provided on a lens surface of a photographic optical system in an area where an effective ray bundle passes, and is at least a part of a bundle of light rays passing through the diffraction surface is led to a light-receiving element for photometry. The photometric apparatus is characterized in that the lens provided with the diffraction surface is disposed in the vicinity of a stop. Each of the first and second specific examples will be described below.

[Eleventh Embodiment]

Figure 11:
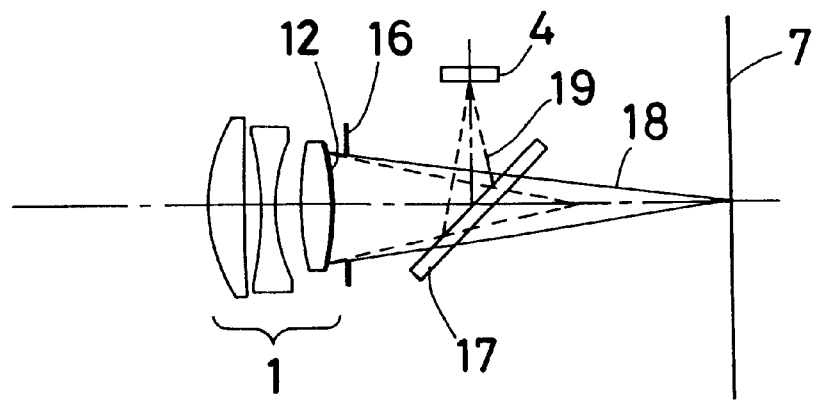
FIG. 11 is a conceptual view showing an eleventh embodiment of the present invention.

FIG. 11 is a conceptual view showing an eleventh embodiment of the present invention. A lens surface of a photographic optical system 1 is provided with a diffraction surface 12 having concentric patterns which are rotationally symmetric about the optical axis, as shown for example in FIG. 13(a). The diffraction surface 12 has an action by which a bundle of light rays passing through the diffraction surface 12 is divided into a zero-order ray bundle 18 and a first-order ray bundle 19. A film plane 7 is placed at the image-formation position of the zero-order ray bundle 18 passing through the diffraction surface 12. A light-receiving element 4 for photometry is placed at the image-formation position of the first-order ray bundle 19 passing through the diffraction surface 12. In this embodiment, a part of the zero-order ray bundle 18 passing through the diffraction surface 12 passes through a half-mirror 17 disposed behind the diffraction surface 12 and is led to the film plane 7. On the other hand, a part of the first-order ray bundle 19 passing through the diffraction surface 12 is reflected by the half-mirror 17 and led to the light-receiving element 4 to perform photometry.

In the eleventh embodiment, because the optical axes of the photographic and photometric systems are coincident with each other, there is no parallax between the photographic and photometric systems, and the accuracy of photometry improves. Moreover, because the diffraction surface 12 has concentric patterns which are rotationally symmetric about the optical axis, the production of the diffraction surface 12 is facilitated.

Figure 13A:
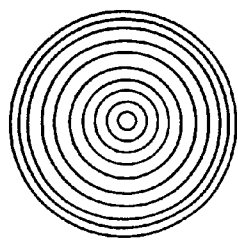
FIGS. 13(a), 13(b) and 13(c) show patterns on diffraction surfaces in the twelfth and thirteenth embodiments of the present invention.
Figure 13B:
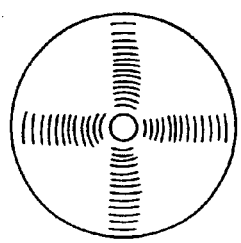
Figure 13C:
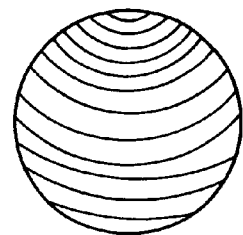

In the eleventh embodiment, the diffraction surface 12 having an optical path dividing action may be provided on only some portions of a lens surface, as shown for example in FIG. 13(b). By doing so, the effect of a diffraction surface manufacturing error on the image quality can be made smaller than in a case where the entire area of a lens surface is formed as a diffraction surface.

[Twelfth Embodiment]

Figure 12:
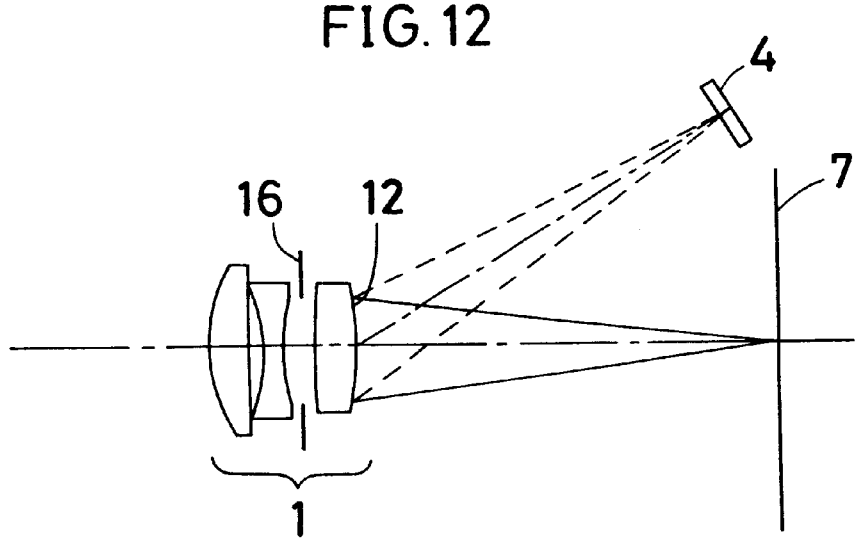
FIG. 12 is a conceptual view showing a twelfth embodiment of the present invention.

FIG. 12 is a conceptual view showing a twelfth embodiment of the present invention. A lens surface of a photographic optical system 1 is provided with a diffraction surface 12 having concentric patterns whose center of rotation is set off the optical axis, as shown for example in FIG. 13(c), thereby deflecting the exit axis. In this embodiment, the diffraction surface 12 has been blazed for a specific wavelength and has an exit axis deflecting action. In a bundle of light rays passing through the diffraction surface 12, light rays of specific wavelength are bent and led to a light-receiving element 4 to perform photometry. The remaining light rays are led to the film plane 7 as they are to form an image thereon.

In the twelfth embodiment, it is possible to bend a ray bundle to any image-formation position at a specific wavelength. Accordingly, it becomes possible to utilize even a small space present in a complicated arrangement in a camera. Moreover, it becomes unnecessary to provide an optical path bending member such as a half-mirror provided in the eleventh embodiment.

In the twelfth embodiment, the diffraction surface 12 may be provided on only some portions of a lens surface. By doing so, the effect of a diffraction surface manufacturing error on the image quality can be made smaller than in a case where the entire area of a lens surface is formed as a diffraction surface.

In either of the eleventh and twelfth embodiments, the diffraction surface 12 having an optical path dividing action is disposed in the vicinity of a stop 16 in the photographic optical system 1. Many light rays gather in the vicinity of the stop 16. Therefore, by providing the diffraction surface 12 in the vicinity of the stop 16, it becomes possible to efficiently capture a ray bundle over the entire area from the center to the periphery.

In the first and second specific examples of the fourth photometric apparatus according to the present invention, a DOE having a ray bundle dividing action is provided in the optical path of the photographic optical system, thereby eliminating a parallax between the photographic and photometric optical systems. Further, it becomes possible to perform TTL metering in a lens shutter camera as well. Therefore, an improvement in the accuracy of photometry can be expected. Moreover, there is no photometer window as is provided in the conventional apparatus. Accordingly, the design freedom increases. Furthermore, there is no likelihood that a part of the acceptance angle will be vignetted by the lens barrel.

In the first specific example of the fourth photometric apparatus, the DOE is formed from concentric patterns. Thus, the production of the DOE is facilitated.

In the second specific example of the fourth photometric apparatus, it becomes possible to efficiently capture a bundle of light rays. Thus, the accuracy of photometry can be improved.

A third specific example of the fourth photometric apparatus according to the present invention relates to a finder optical system and a photometric apparatus. It is characterized in that at least one diffraction surface having an optical path dividing action is provided on a lens surface of a finder optical system in an area where an effective ray bundle passes, and that at least a part of a bundle of light rays passing through the diffraction surface is led to a light-receiving element for photometry.

The third specific example will be described below.

[Thirteenth Embodiment]

FIG. 14 is a conceptual view showing a thirteenth embodiment of the present invention. An objective lens surface of a finder optical system 2 is provided with a diffraction surface 12 having an optical path dividing action, such as that shown in FIG. 13(a) or 13(b). Zero-order light passing through the diffraction surface 12 is led to a finder field system, whereas first-order light is reflected by a half-mirror 17, which is disposed behind the objective lens, and led to a light-receiving element 4 to perform photometry.

In the above-described third specific example of the fourth photometric apparatus according to the present invention, there is no parallax between the finder field system and the photometric system. Moreover, there is no photometer window as is provided in the conventional apparatus. Accordingly, the design freedom increases. Thus, in the fourth photometric apparatus, a diffraction surface is given an exit angle deflecting action, thereby allowing the interior components of a camera to be arranged with an increased degree of freedom.

Next, the arrangement and operation of a fifth photometric apparatus according to the present invention will be described.

[Fourteenth Embodiment]

FIGS. 15, 16(a) and 16(b) show a fifth photometric apparatus according to the present invention. FIG. 15 is a conceptual view showing a fourteenth embodiment of the present invention. A diffraction surface 12 having a converging lens action is provided on a chamfered portion of an objective lens 20 of a finder optical system 2, and a bundle of light rays passing through the diffraction surface 12 is led to a light-receiving element 4. In the fourteenth embodiment, the photometric optical system is completely independent of a bundle of light rays other than the ray bundle used for photometry. Therefore, the components can be integrated into one unit without a possibility that a deterioration of the performance due to a diffraction surface manufacturing error will affect a ray bundle other than that used in the photometric optical system. Thus, it becomes possible to reduce the size and cost of the apparatus.

As shown in the front view of FIG. 16(a) and the side view of FIG. 16(b), the diffraction surface 12 may be provided on a collar portion of any of lenses constituting the finder optical system 2. In this case also, advantageous effects similar to those in the fourteenth embodiment are obtained.

It is also possible to provide the diffraction surface 12 on an external portion of a photographic optical system or a distance measuring optical system. In this case also, advantageous effects similar to those in the fourteenth embodiment are obtained.

In the above-described fifth photometric apparatus according to the present invention, the components of the photometric optical system and those of another optical system can be integrated into one unit. Thus, it becomes possible to reduce the size and cost of the apparatus. By giving an exit angle deflecting action to the diffraction surface 12, the light-receiving element 14 can be disposed with a high degree of freedom. Thus, it becomes possible to make good use of the space in the camera. It should be noted that it is preferable to provide a light-blocking member, e.g. a masking member, in the vicinity of the boundary between the two optical systems so that light rays in one optical system will not enter the other optical system.

Next, the arrangement and operation of a sixth photometric apparatus according to the present invention will be described.

Figure 17:
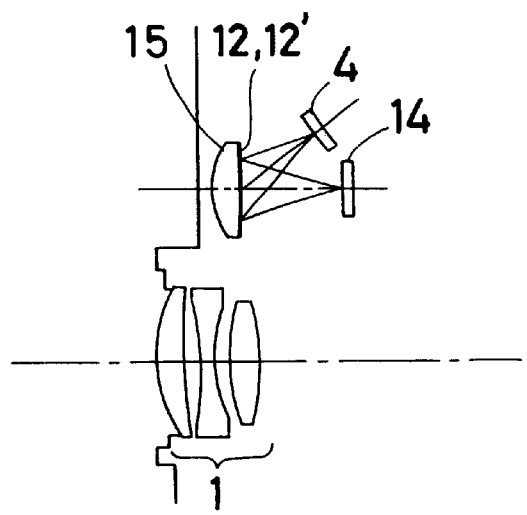
FIG. 17 is a conceptual view showing a fifteenth embodiment of the present invention.
Figure 18:
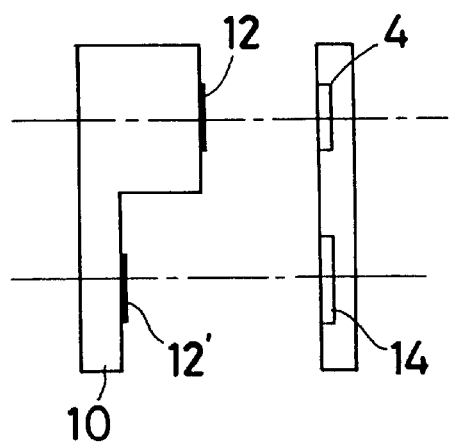
FIG. 18 is a conceptual view showing a sixteenth embodiment of the present invention.

FIGS. 17 and 18 show embodiments of a sixth photometric apparatus according to the present invention.

[Fifteenth Embodiment]

FIG. 17 is a conceptual view showing a fifteenth embodiment of the present invention, which has a distance measuring apparatus and a photometric apparatus. One surface of a distance measuring optical system 15 is provided with a diffraction surface formed in a multiple structure consisting essentially of a diffraction surface 12 blazed for infrared light and a diffraction surface 12' having an exit angle deflecting action and blazed for visible light. A bundle of visible light rays is deflected by the diffraction surface 12' and led to a light-receiving element 4 for photometry. A bundle of infrared light rays passes through the diffraction surface 12 and is led to a light-receiving element 14 for distance measurement. In this embodiment, the photometric optical system and the distance measuring optical system can be integrated into one unit. Accordingly, the cost can be reduced by a reduction in the number of components, and the size of the apparatus can be reduced by space savings.

[Sixteenth Embodiment]

FIG. 18 is a conceptual view showing a sixteenth embodiment of the present invention. Two diffraction surfaces 12 and 12' having different converging lens actions are provided on the same substrate. One ray bundle passing through the diffraction surface 12' is led to a light-receiving element 14 for distance measurement, and another ray bundle passing through the diffraction surface 12 is led to a light-receiving element 4 for photometry. The light-receiving elements 4 and 14 are formed on the same chip. In this embodiment, the cost can be reduced by a reduction in the number of components. It is also possible to simplify the assembly of the apparatus.

In the above-described sixth photometric apparatus according to the present invention, it is possible to reduce the cost and size of the apparatus by a reduction in the number of components. Further, by giving an exit angle deflecting action to the diffraction surface, the space can be effectively utilized, and thus a reduction in the size can be achieved. Moreover, it becomes possible to arrange the components with an increased degree of freedom. It is preferable to dispose a light-blocking member such that one ray bundle will not interfere with the other ray bundle.

It should be noted that the sixth photometric apparatus is also applicable to an active type light-projecting lens system and a passive type photometric optical system. In such a use application also, advantageous effects similar to those stated above are obtained.

Next, the arrangement and operation of a seventh photometric apparatus according to the present invention will be described.

FIGS. 19 to 22 show embodiments of the seventh photometric apparatus according to the present invention.

[Seventeenth Embodiment]

Figure 19A:
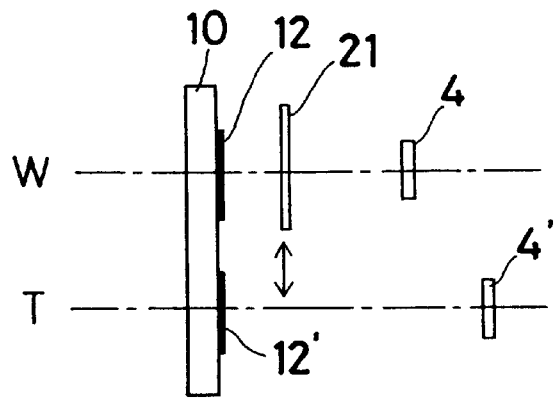
FIG. 19(a) is a conceptual view showing a seventeenth embodiment of the present invention.
Figure 19B:
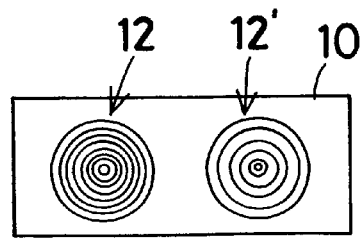
FIG. 19(b) shows patterns on a diffraction surface in the seventeenth embodiment.

FIG. 19(a) is a conceptual view showing a seventeenth embodiment of the present invention. In this embodiment, the present invention is applied to a photometric apparatus for a lens shutter camera in which the angle of coverage is variable. As shown in FIG. 19(a), a DOE 10 has diffraction surfaces 12 and 12' formed in parallel on the same substrate. The diffraction surfaces 12 and 12' have different converging lens actions. The number of light-receiving elements 4 and 4' which is equal to the number of diffraction surfaces provided are disposed at appropriate positions. A suitable light-receiving element is selected according to photography conditions (e.g. a field angle change or switching to the panoramic photography mode) to perform photometry. According to this embodiment, it is possible even with a lens shutter camera to obtain the correct exposure at all times independently of photography conditions with a simple arrangement. In this embodiment, photometry can be effected even more accurately by selectively covering an unnecessary area with a light-blocking member (e.g., a mask or a liquid-crystal shutter) 21.

[Eighteenth Embodiment]

Figure 20:
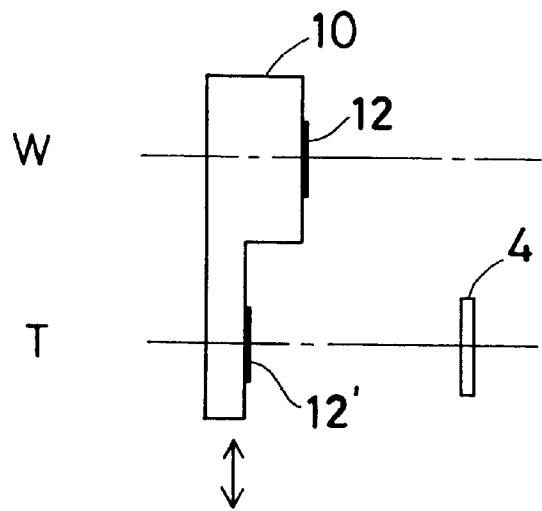
FIG. 20 is a conceptual view showing an eighteenth embodiment of the present invention.

FIG. 20 is a conceptual view showing an eighteenth embodiment of the present invention. A DOE 10 has diffraction surfaces 12 and 12' formed in parallel on the same substrate. The diffraction surfaces 12 and 12' have different converging lens actions. A single light-receiving element 4 is disposed behind the DOE 10. The DOE 10 slides vertically according to photography conditions (e.g. a field angle change or switching to the panoramic photography mode), thereby selecting a necessary area to perform photometry. Moreover, in this embodiment, the thickness of the substrate varies for each of the diffraction surfaces 12 and 12', so that a bundle of light rays passing through either of the diffraction surfaces 12 and 12' forms an image at substantially the same position (i.e. the position of the light-receiving element 4). In this embodiment, advantageous effects similar to those in the seventeenth embodiment are obtained.

Further, in this embodiment, the image-formation positions of ray bundles passing through the diffraction surfaces 12 and 12' can be made approximately coincident with each other by a combination of the thickness of the substrate and the converging actions of the diffraction surfaces 12 and 12'. Thus, it is possible to reduce the number of light-receiving elements to one. Even more accurate photometry can be performed by covering an unnecessary area with a light-blocking member (e.g., a mask or a liquid-crystal shutter).

[Nineteenth Embodiment]

Figures 21A, 21B:
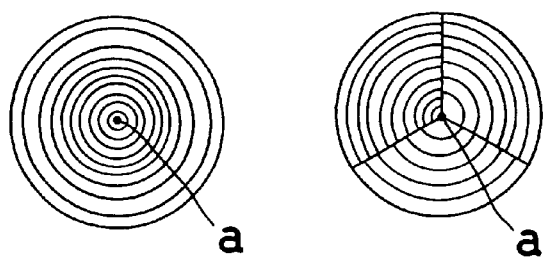
FIGS. 21(a) and 21(b) show patterns on a diffraction surface in a nineteenth embodiment of the present invention.

FIGS. 21(a) and 21(b) show different patterns for a DOE 10 used in a switching type photometric apparatus similar to the above. In FIG. 21(a), a plurality of diffraction surfaces having different converging lens actions are concentrically formed on the same substrate. In FIG. 21(b), a plurality of diffraction surfaces having different converging lens actions are formed on the same substrate in a sectorial shape. In these cases, a light-receiving element 4 is disposed on an optical axis perpendicular to the pattern center a of the DOE 10, and an unnecessary area is covered with a light-blocking member (e.g. a mask) according to photography conditions (e.g. a field angle change or switching to the panoramic photography mode) to thereby select a necessary area. The light-receiving element 4 is moved along the optical axis according to each particular image-formation position to perform photometry. In this embodiment, advantageous effects similar to those in the seventeenth embodiment are obtained.

[Twentieth Embodiment]

Figure 22:
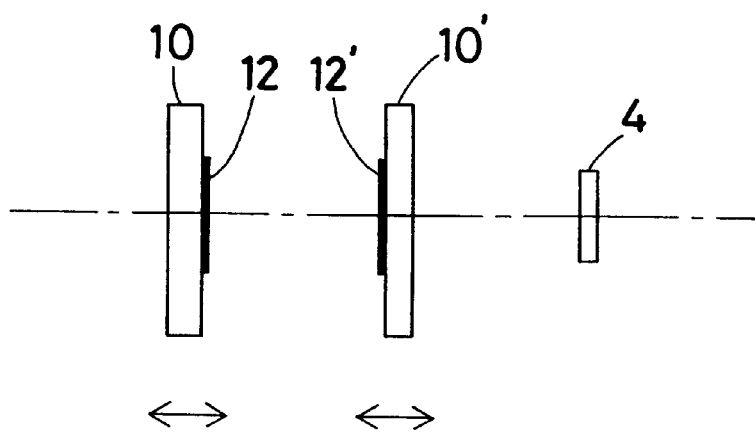
FIG. 22 is a conceptual view showing a twentieth embodiment of the present invention.

FIG. 22 is a conceptual view showing a twentieth embodiment of the present invention. In this embodiment, the present invention is applied to a photometric apparatus for a lens shutter camera in which the angle of coverage is variable, particularly for a camera having a zoom lens. The photometric apparatus includes DOEs 10 and 10' provided with respective diffraction surfaces 12 and 12' having a converging or diverging lens action. The spacing between the DOEs 10 and 10' is varied according to photography conditions (e.g. a field angle change or switching to the panoramic photography mode) to effect a magnification change, thereby performing photometry for each photography mode. In this embodiment, advantageous effects similar to those in the seventeenth embodiments are obtained. In addition, it is possible to cope with a continuous change in the field angle, and it becomes unnecessary to use a light-blocking member (e.g. a mask). The use of a DOE in a variable-magnification photometric optical system enables the photometric mechanism to be formed in a relatively thin structure.

In the above-described seventh photometric apparatus according to the present invention, it is possible even with a lens shutter camera to obtain the correct exposure at all times independently of photography conditions with a simple arrangement.

In the first to seventh photometric apparatuses according to the present invention, the diffraction surfaces may have a curvature. If a diffraction surface has a curvature, it is possible to share the refracting action at the diffraction surface and to increase the degree of freedom of design for aberration correction. Thus, it is possible to attain a high-performance and highly optioned photometric apparatus. In the first to seventh photometric apparatuses, the diffraction surface may be a combination of a plurality of diffraction surfaces and lens components. In this case, advantageous effects similar to those stated above are obtained, and it is possible to attain a higher-performance and even more highly optioned photometric apparatus.

The DOE may be arranged such that one surface thereof has a converging power, and the other surface thereof has a diverging power with this arrangement, the position of the principal point of the DOE can be changed, and thus the components of the photometric apparatus can be arranged with an increased degree of freedom. If the DOE is a plate-shaped DOE having flat surfaces on both sides thereof, it is possible to further reduce the thickness, size and weight of the apparatus. The diffraction surface may be formed on a glass substrate. However, it is preferable to form a diffraction surface on a plastic substrate by molding. By doing so, it becomes possible to achieve a higher level of mass-production and to further reduce the cost and weight of the apparatus.

As has been described above, according to the present invention, a DOE is provided in a photometric optical system of a camera, thereby making it possible to provide a photometric apparatus for a camera which satisfies the demands for reductions in the size, thickness and cost of the apparatus. Further, the present invention enables the photometric apparatus to be highly optioned despite a simple arrangement while satisfying the demands for reductions in the size, thickness and cost.

What we claim is:

1. A photometric apparatus for a camera, comprising:

a plate-shaped photometer window on an outermost side, a photometric optical system provided separately from a photographic optical system, and a light-receiving element for photometry, said photometric optical system having at least one diffractive optical element having at least one diffraction surface, and said diffractive optical element having a lens action, wherein:
        said diffractive optical clement has said diffraction surface on a front side thereof.

2. A photometric apparatus for a camera, comprising:

a plate-shaped photometer window on an outermost side, a photometric optical system provided separately from a photographic optical system, and a light-receiving element for photometry, said photometric optical system consisting of one diffractive optical element having at least one diffraction surface, and said diffractive optical element having a lens action, wherein:
        said diffractive optical element has said diffraction surface on a front side thereof.

3. A photometric apparatus according to claim 1, wherein said diffractive optical element and said light-receiving element for photometry are integral with each other.

4. A photometric apparatus according to claim 1, wherein a bundle of light rays is deflected by said diffractive optical element.

5. A photometric apparatus according to claim 1, wherein said diffraction surface has a curvature.

6. A photometric apparatus according to claim 1, wherein said diffractive optical element comprises a plastic substrate.

* * * * *